Aug. 7, 1928. 1,679,754
G. VON JALSOVICZKY
TRACTOR
Filed July 5, 1926
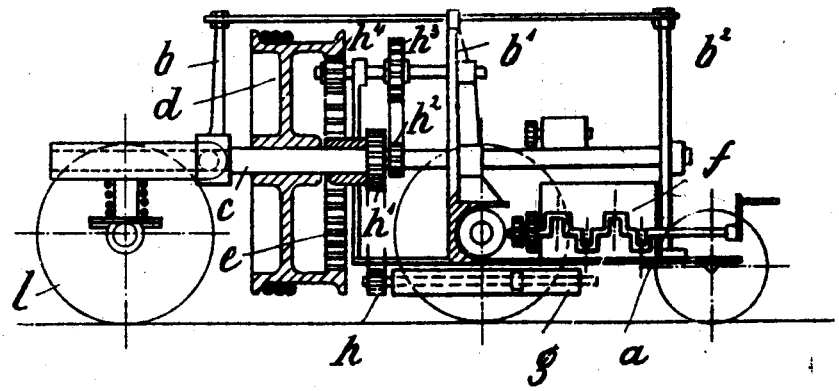
FIG. 1
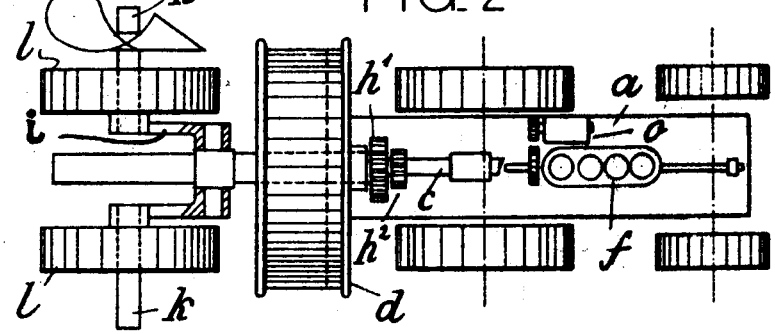
FIG. 2
FIG. 3
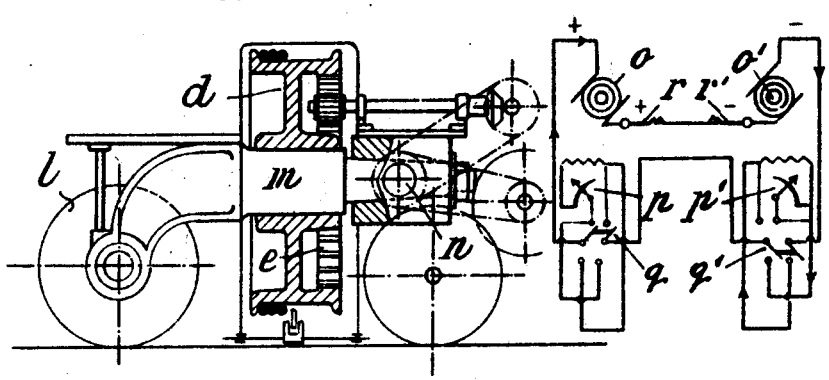
FIG. 4
G. Von Jalsoviczky
inventor
By: Marks & Clark
Attys Patented Aug. 7, 1928.

1,679,754

UNITED STATES PATENT OFFICE.

GÉZA VON JALSOVICZKY, OF BUDAPEST, HUNGARY.

TRACTOR.

Application filed July 8, 1926, Serial No. 121,239, and in Hungary March 30, 1926.

Tractors having ploughs or other tilling appliances forming an integral part of them have the disadvantage that during the tilling operation the tractor together with the plough is moved to and fro along the ground, whereby partly owing to the weight of the tractor and partly owing to the resistance of the soil, more particularly when tilling damp and boggy soil, a great part of the available power is wasted. Furthermore, owing to the fact that the tractor is subjected during tilling operations to constant vibration, it is not reliable in working and has only a short life.

Prime movers, for instance portable engines, are known, which are located at both ends of the field and are provided with haulage means forming an integral part of them, with which they haul the tilling appliance alternately to and fro. Apart from various drawbacks as regards economical working the efficiency of this arrangement is relatively very low, as on the one hand an amount of haulage rope corresponding in length to the length of the surface to be tilled has to be alternately wound in several layers on to and unwound from the periphery of the relatively narrow drum, the peripheral surface of which is limited by the construction of the prime mover, resulting in considerable power-consuming friction, and on the other hand the available power of the machines is not completely utilized, as they alternately run idle, during which they perform no useful work.

The object of the present invention is to combine the known advantages of the tractor and of the portable engines placed at both ends of the field, while avoiding the disadvantages referred to, and consists substantially in this, that the tractor is provided not with the plough, but with a rope drum or haulage means capable of being readily placed in position and removed. Through the hauling means forming a unit which is independent of the tractor, the peripheral surface or the width of the rope drum may be made such that the whole length of the haulage rope can be wound on in a single layer, whereby losses due to friction are avoided.

In order to utilize the alternate idle running period of the tractors placed at either end of the field an electrical arrangement attached to the frames of the two tractors is provided, each arrangement consisting of a synchronously running electric continuous current machine of equal power, which are so connected together that their electromotive forces act in opposition to one another, so that while one acts as an electric motor the other acts as a dynamo. The electric motor of one tractor is connected to the dynamo of the other tractor by a cable. The earth may be used as the other conductor. Both the electric motor and the dynamo are connected by toothed wheel or chain gearing to the driving shaft of the tractor, so that one of the idle running driving shafts produces current, while the electric motor of the tractor which is operative gives off power to the driving shaft. When the motors of one tractor are drawing the plow, the motors on the other tractor will be disconnected from the drum.

Electric arrangements of this kind are known. The arrangement according to the present invention, however, consists substantially in this, that the amount of electrical energy to be transmitted is immediately automatically regulated in accordance with the variations of load on the tilling appliance and that, as soon as the load ceases, the voltage is automatically cut off, whereby not only the persons attending to the machine are protected against accidents, but the electric motor cannot drive the idle running driving shaft.

One or two guide wheels are provided for guiding the rope drum, the shaft of which is extended to such an extent that on the end of the shaft extending out of the rope drum on one or both sides, a resistance producing appliance, for instance one or more ploughs performing useful work may be fixed, whereby the tractor is properly guided and a lateral displacement of the same is prevented.

In the accompanying drawing two constructional examples of the invention are shown, it being understood that the constructional details of the same may be varied to suit the particular tractor which is to be used, without departing from the spirit of the invention.

Fig. 1 is a diagrammatic side view, partly in elevation and partly in section of one constructional example.

Fig. 2 is a plan view of the same,

Fig. 3 is a side view of the second constructional example, partly in elevation and partly in section, and Fig. 4 is a diagram showing the connections of the continuous current machine used.

In the tractor $a$ in Fig. 1 the shaft $c$ is fixed in easily removable standards $b$, $b^1$, $b^2$, the rope drum $d$ being mounted so as to be rotatable on the said shaft. The rope drum which is provided with an internal ring of teeth $e$ is rotated by the motor $f$ of the tractor through the speed regulator $g$ and the toothed wheel gearing $h$, $h^1$, $h^2$, $h^3$ and $h^4$, for winding the rope on to the drum and paying it out. The width of the rope drum is such that the entire working length of the rope can be wound on to it in a single layer.

The front part of the shaft $c$ carries a forked member $i$, on the stub shafts $k$ of which the guide wheels $l$ are rotatably and yieldingly mounted. The stub shafts are extended beyond the wheels, so that for instance one or more ploughs may be mounted on them, which both act as a resistance to lateral displacements and are capable of performing useful work, when the tractor is moved from one place to another.

In the example shown in Fig. 3 the journal $n$ of the shaft $m$ is rotatable in a bearing in the tractor, so that the guide wheels $l$ can follow the inequalities of the ground. This bearing may be made in the form of a universal joint.

In Fig. 4 the diagram of connections of the continuous current machines $o$ and $o^1$ of equal power is shown, the machines being each mounted on one of the tractors and being so connected with respect to each other that their electromotive forces act in opposite directions, the machine $o$ for instance of the operative tractor acting as an electric motor and acting through toothed gearing or chain wheels on the driving shaft of the motor $f$, while the machine $o^1$ of the idle tractor acts as a dynamo and is driven by the driving shaft of the motor $f$. The two continuous current machines are regulated by the resistances $p$—$p^1$.

The continuous current machines act in the following manner: The two machines are caused to run at the same speed, so that they produce similar electromotive forces in opposite directions and thus neutralize each other and no current will flow between the two continuous current machines. When the continuous current machine $o$ gives off its work to the driving shaft of the operative tractor, its speed of rotation will drop, its electromotive force will be reduced and in consequence the current will flow from the machine $o^1$ of the other tractor to the machine $o$, which now acts as an electric motor. The amount of the transmitted electromotive energy is dependent on the difference between the the speed of revolution of the two machines and therefore ultimately on the load on the motor.

By means of the change-over switches $q$, $q^1$, the machine $o^1$ can be made to run as an electric motor and the machine $o$ as a dynamo.

What I claim is:

1. In combination two tractors, each having a power engine, an electric machine capable of running either as a dynamo or as a motor, removable supports, a shaft fixed in the said supports, a rope drum capable of rotating on the shaft, means for transmitting the rotary motion of the electric machine to the rope drum, stub shafts, guide wheels on the stub shafts, tilling appliances mounted on the stub shafts for preventing a lateral displacement of the tractor, a hauling rope between the two hauling drums capable of being wound from one on to the other and of hauling a reversible plough and means for supplying electric energy generated by the electric machine on one tractor to the electric machine on the other tractor in accordance with the load, as set forth.

2. The combination of two tractors as claimed in claim 1, and in which the rope drums are of such a width that the entire working length of the hauling rope can be wound on to the periphery of the drum in a single layer, as set forth.

3. The combination of two tractors as claimed in claim 1 and in which the removable shaft of the rope drum is pivoted to the tractor, as set forth.

4. In combination two tractors, each having a power engine, an electric machine capable of running either as a dynamo or as a motor, removable supports, a shaft fixed in the said supports, a rope drum capable of rotating on the shaft, means for transmitting the rotary motion of the electric machine to the rope drum, stub shafts, guide wheels on the stub shafts, ploughs mounted on the ends of the stub shafts for preventing a lateral displacement and for performing useful work when the tractor is being moved from one position to another, a hauling rope between the two hauling drums capable of being wound from one on to the other and of hauling a reversible plough and means for supplying electric energy generated by the electric machine on one tractor to the electric machine on the other tractor in accordance with the load, as set forth.

5. In combination two tractors, each having a power engine, a continuous current electric machine capable of running either as a dynamo or as a motor, means for positively driving the electric machine from the engine shaft, the speeds of the two machines being the same and the electromotive forces produced being equal and opposite, means for transmitting the rotary motion of the electric machine to the rope drum, stub shafts, guide wheels on the stub shafts, tilling appliances mounted on the stub shafts for preventing a lateral displacement of the tractor, a hauling rope between the two hauling drums capable of being wound from one on to the other and of hauling a reversible plough and means for supplying electric energy generated by the electric machine on one tractor to the electric machine on the other tractor in accordance with the load, as set forth.

In testimony whereof I have signed my name to this specification.

GÉZA von JALSOVICZKY.